(12) United States Patent
Rao et al.

(10) Patent No.: US 10,896,476 B2
(45) Date of Patent: Jan. 19, 2021

(54) REPOSITORY OF INTEGRATION DESCRIPTION OF HARDWARE INTELLECTUAL PROPERTY FOR NOC CONSTRUCTION AND SOC INTEGRATION

(71) Applicant: NetSpeed Systems, Inc., San Jose, CA (US)

(72) Inventors: Nishant Rao, San Jose, CA (US); Sailesh Kumar, San Jose, CA (US); Pier Giorgio Raponi, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 0 days.

(21) Appl. No.: 16/119,474

(22) Filed: Aug. 31, 2018

(65) Prior Publication Data

US 2019/0259113 A1 Aug. 22, 2019

Related U.S. Application Data

(60) Provisional application No. 62/634,111, filed on Feb. 22, 2018.

(51) Int. Cl.
*G06F 30/00* (2020.01)
*G06Q 50/18* (2012.01)
*G06F 16/13* (2019.01)

(52) U.S. Cl.
CPC .......... *G06Q 50/184* (2013.01); *G06F 16/13* (2019.01)

(58) Field of Classification Search
CPC ...................................................... G06F 16/13
(Continued)

(56) References Cited

U.S. PATENT DOCUMENTS 4,409,838 A 10/1983 Schomberg
4,933,933 A 6/1990 Dally et al.
(Continued)

FOREIGN PATENT DOCUMENTS

CN 103684961 A 3/2014
JP 5936793 5/2016
(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Suchin Parihar
(74) *Attorney, Agent, or Firm* — Spectrum IP Law Group LLC

(57) ABSTRACT

Methods and example implementations described herein are generally directed to repository of integration description of hardware intellectual property (IP) for NoC construction and SoC integration. An aspect of the present disclosure relates to a method for managing a repository of hardware intellectual property (IP) for Network-on-Chip (NoC)/System-on-Chip (SoC) construction. The method includes the steps of storing one or more integration descriptions of the hardware IP in the repository, selecting at least one integration description as a parsed selection from said one or more integration descriptions of the hardware IP for incorporation in the NoC/SoC, and generating the NoC/SoC at least from the parsed selection.

22 Claims, 16 Drawing Sheets

(58) Field of Classification Search
USPC .......................................................... 716/138
See application file for complete search history.

(56) References Cited

U.S. PATENT DOCUMENTS

| | | | |
|---|---|---|---|
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A | 6/1998 | Holender | |
| 5,790,554 A | 8/1998 | Pitcher et al. | |
| 5,859,981 A | 1/1999 | Levin et al. | |
| 5,991,308 A | 11/1999 | Fuhrmann et al. | |
| 5,999,530 A | 12/1999 | LeMaire et al. | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 | 4/2002 | Grover et al. | |
| 6,415,282 B1 | 7/2002 | Mukherjea et al. | |
| 6,477,691 B1* | 11/2002 | Bergamashirab | G06F 30/30 716/104 |
| 6,658,633 B2* | 12/2003 | Devins | G06F 17/5022 703/13 |
| 6,674,720 B1 | 1/2004 | Passint et al. | |
| 6,701,361 B1 | 3/2004 | Meier | |
| 6,711,717 B2 | 3/2004 | Nystrom et al. | |
| 6,778,531 B1 | 8/2004 | Kodialam et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 6,993,740 B1* | 1/2006 | Bergamaschi | G06F 30/394 324/762.06 |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,228,520 B1* | 6/2007 | Keller | G06F 17/5054 716/116 |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 | 7/2009 | Radulescu | |
| 7,583,602 B2 | 9/2009 | Bejerano et al. | |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,098,677 B1 | 1/2012 | Pleshek et al. | |
| 8,099,757 B2 | 1/2012 | Riedle et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,438,578 B2 | 5/2013 | Hoover et al. | |
| 8,448,102 B2 | 5/2013 | Kornachuk et al. | |
| 8,490,110 B2 | 7/2013 | Hoover et al. | |
| 8,492,886 B2 | 7/2013 | Or-Bach et al. | |
| 8,503,445 B2 | 8/2013 | Lo | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,572,353 B1 | 10/2013 | Bratt et al. | |
| 8,601,423 B1 | 12/2013 | Philip et al. | |
| 8,614,955 B2 | 12/2013 | Gintis et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 | 4/2014 | Abts et al. | |
| 8,711,867 B2 | 4/2014 | Guo et al. | |
| 8,717,875 B2 | 5/2014 | Bejerano et al. | |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 8,885,510 B2 | 11/2014 | Kumar et al. | |
| 9,210,048 B1 | 12/2015 | Marr et al. | |
| 9,223,711 B2 | 12/2015 | Philip et al. | |
| 9,244,845 B2 | 1/2016 | Rowlands et al. | |
| 9,244,880 B2 | 1/2016 | Philip et al. | |
| 9,253,085 B2 | 2/2016 | Kumar et al. | |
| 9,294,354 B2 | 3/2016 | Kumar | |
| 9,319,232 B2 | 4/2016 | Kumar | |
| 9,444,702 B1 | 9/2016 | Raponi et al. | |
| 9,471,726 B2 | 10/2016 | Kumar et al. | |
| 9,473,359 B2 | 10/2016 | Kumar et al. | |
| 9,473,388 B2 | 10/2016 | Kumar et al. | |
| 9,473,415 B2 | 10/2016 | Kumar | |
| 9,477,280 B1 | 10/2016 | Gangwar et al. | |
| 9,529,400 B1 | 12/2016 | Kumar et al. | |
| 9,535,848 B2 | 1/2017 | Rowlands et al. | |
| 9,568,970 B1 | 2/2017 | Kaushal et al. | |
| 9,569,579 B1 | 2/2017 | Kumar | |
| 9,571,341 B1 | 2/2017 | Kumar et al. | |
| 9,571,402 B2 | 2/2017 | Kumar et al. | |
| 9,571,420 B2 | 2/2017 | Kumar | |
| 9,590,813 B1 | 3/2017 | Kumar et al. | |
| 9,647,921 B2* | 5/2017 | Rangan | H04L 43/106 |
| 9,660,942 B2 | 5/2017 | Kumar | |
| 9,699,079 B2 | 7/2017 | Chopra et al. | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2002/0150094 A1 | 10/2002 | Cheng et al. | |
| 2003/0005149 A1 | 1/2003 | Haas et al. | |
| 2003/0088602 A1 | 5/2003 | Dutta et al. | |
| 2003/0093764 A1* | 5/2003 | Devins | G06F 30/33 716/106 |
| 2003/0145314 A1 | 7/2003 | Nguyen et al. | |
| 2003/0200315 A1 | 10/2003 | Goldenberg et al. | |
| 2003/0229482 A1* | 12/2003 | Cook | G06F 17/5045 703/14 |
| 2004/0006584 A1 | 1/2004 | Vandeweerd | |
| 2004/0019814 A1 | 1/2004 | Pappalardo et al. | |
| 2004/0049565 A1 | 3/2004 | Keller et al. | |
| 2004/0103218 A1 | 5/2004 | Blumrich et al. | |
| 2004/0156376 A1 | 8/2004 | Nakagawa | |
| 2004/0156383 A1 | 8/2004 | Nakagawa et al. | |
| 2004/0216072 A1 | 10/2004 | Alpert et al. | |
| 2005/0147081 A1 | 7/2005 | Acharya et al. | |
| 2005/0203988 A1 | 9/2005 | Nollet et al. | |
| 2005/0228930 A1 | 10/2005 | Ning et al. | |
| 2005/0286543 A1 | 12/2005 | Coppola et al. | |
| 2006/0002303 A1 | 1/2006 | Bejerano et al. | |
| 2006/0031615 A1 | 2/2006 | Bruce et al. | |
| 2006/0053312 A1 | 3/2006 | Jones et al. | |
| 2006/0075169 A1 | 4/2006 | Harris et al. | |

(56) References Cited

U.S. PATENT DOCUMENTS

| | | |
|---|---|---|
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0256836 A1 | 10/2009 | Fowler et al. |
| 2009/0268677 A1 | 10/2009 | Chou et al. |
| 2009/0282222 A1 | 11/2009 | Hoover et al. |
| 2009/0282227 A1 | 11/2009 | Hoover et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0162019 A1 | 6/2010 | Kumar et al. |
| 2010/0211718 A1 | 8/2010 | Gratz et al. |
| 2010/0223505 A1* | 9/2010 | Andreev ............ G06F 11/3668 714/37 |
| 2010/0228781 A1 | 9/2010 | Fowler et al. |
| 2010/0242003 A1 | 9/2010 | Kwok |
| 2010/0284309 A1 | 11/2010 | Allan et al. |
| 2011/0022754 A1 | 1/2011 | Cidon et al. |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2011/0320991 A1 | 12/2011 | Hsu et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0080073 A1 | 3/2013 | de Corral |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0160026 A1 | 6/2013 | Kuesel et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Mooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0211622 A1 | 7/2014 | Kumar et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0307590 A1 | 10/2014 | Dobbelaere et al. |
| 2014/0376569 A1 | 12/2014 | Philip et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |

(56) References Cited

U.S. PATENT DOCUMENTS

| | | | |
|---|---|---|---|
| 2015/0331831 A1 | 11/2015 | Solihin | |
| 2015/0348600 A1 | 12/2015 | Bhatia et al. | |
| 2016/0180001 A1* | 6/2016 | Adler | G06F 17/5045 716/138 |
| 2016/0299860 A1* | 10/2016 | Harriman | G06F 13/36 |
| 2017/0061053 A1 | 3/2017 | Kumar et al. | |
| 2017/0063625 A1 | 3/2017 | Philip et al. | |
| 2017/0063697 A1 | 3/2017 | Kumar | |
| 2018/0088801 A1* | 3/2018 | Cherubini | G11C 13/004 |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), 14 pages.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, 10 pages.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W. et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71(5), May 2011, 14 pages.

Lin, S., et al., Scalable Connection-Based Flow Control Scheme for Application-Specific Network-on-Chip, The Journal of China Universities of Posts and Telecommunications, Dec. 2011, 18(6), 8 pages.

Bolotin, Evgency, et al., "QNoC: QoS Architecture and Design Process for Network on Chip" 2004, 24 pages, Journal of Systems Architecture 50 (2004) 105-128 Elsevier.

Holsmark, Shashi Kumar Rickard, et al., "HiRA: A Methodology for Deadlock Free Routing in Hierarchical Networks on Chip", 10 pages, (978-1-4244-4143-3/09 2009 IEEE).

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Rajesh BV, Shivaputra, "NoC: Design and Implementation of Hardware Network Interface With Improved Communication Reliability", International Journal of VLSI and Embedded Systems, IJIVES, vol. 04, Article 06116; Jun. 2013, 7 pages.

Yang, J., et al., Homogeneous NoC-based FPGA: The Foundation for Virtual FPGA, 10th IEEE International Conference on Computer and Information Technology (CIT 2010), Jun. 2010, 6 pages.

Zaman, Aanam, "Formal Verification of Circuit-Switched Network on Chip (NoC) Architectures using SPIN", Oosman Hasan, IEEE © 2014, 8 pages.

Benini, Luca, et al., "Networks on Chips: A New SoC Paradigm", IEEE Computers, SOC Designs, Copyright 2002 IEEE. 0018-9162/ 02, 9 pages.

Sethuraman, Ranga Vemuri Balasubramanian, "optiMap: A Tool for Automated Generation of NoC Architecture Using Multi-Port Routers for FPGAs", IEEE, 6 pages, 2006.

International Search Report and Written Opinion for PCT/US2014/ 060745, dated Jan. 21, 2015, 10 pgs.

International Search Report and Written Opinion for PCT/US2014/ 060879, dated Jan. 21, 2015, 10 pgs.

International Search Report and Written Opinion for PCT/US2014/ 060892, dated Jan. 27, 2015, 10 pgs.

International Search Report and Written Opinion for PCT/US2014/ 060886, dated Jan. 26, 2015, 10 pgs.

International Search Report and Written Opinion for PCT/US2013/ 064140, dated Jan. 22, 2014, 9 pgs.

International Search Report and Written Opinion for PCT/US2014/ 012003, dated Mar. 26, 2014, 9 pgs.

International Search Report and Written Opinion for PCT/US2014/ 012012, dated May 14, 2014, 10 pgs.

International Search Report and Written Opinion for PCT/US2014/ 023625, dated Jul. 10, 2014, 9 pgs.

International Preliminary Report on Patentability for International Application No. PCT/US2013/064140, dated Apr. 14, 2015, 5 pages.

Office Action for Korean Patent Application No. 10-2016-7019093 dated Sep. 8, 2016, English translation provided, 4 pages.

Notice of Allowance for for Korean Patent Application No. 10-2016- 7019093 dated Sep. 8, 2016, 5 pages.

International Search Report and Written Opinion for PCT/US2014/ 037902, dated Sep. 30, 2014, 14 pgs.

Office Action for Japanese Patent Application No. 2015-535898 dated Oct. 25, 2016, English translation provided, 4 pages.

Notice of Grant for Japanese Patent Application No. 2015-535898 dated Jan. 17, 2017, 3 pages.

International Search Report and Written Opinion for PCT/US2014/ 048190, dated Nov. 28, 2014, 11 pgs.

Office Action for Japanese Patent Application No. 2016-516030 dated Aug. 30, 2016, English translation provided, 4 pages.

Decision to Grant for Japanese Patent Application No. 2016-516030 dated Nov. 22, 2016, English translation provided, 6 pages.

* cited by examiner

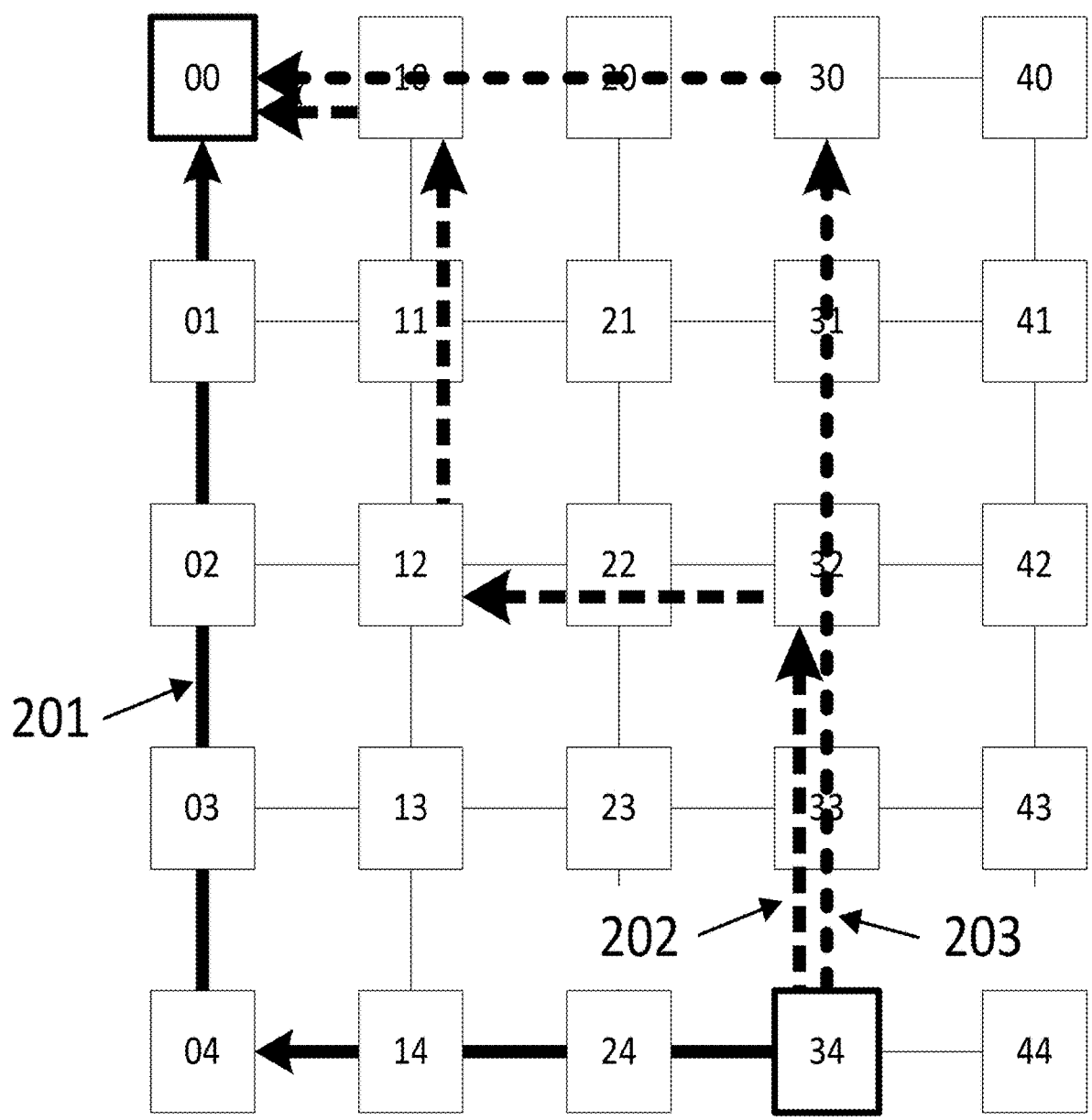

though the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remains sub-optimal and inefficient. A number of innovations to address these problems are described in U.S. patent application Ser. Nos. 13/658,663, 13/752,226, 13/647,557, 13/856,835, 13/723,732, the contents of which are hereby incorporated by reference in their entirety.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. In addition to this, information such as position of various components such as bridges or ports on boundary of hosts, traffic information, chip size information, etc. may be supplied. A NoC compiler (topology generation engine) can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters. Specifications can also be in the form of power specifications to define power domains, voltage domains, clock domains, and so on, depending on the desired implementation.

Placing hosts/IP cores in a SoC floorplan to optimize the interconnect performance can be important. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain performance metrics such as average global communication latency may be used as an objective function to optimize the SoC architecture with the hosts being placed in a NoC topology. Determining substantially optimal host positions that maximizes the system performance metric may involve analyzing the connectivity and inter-communication properties between all hosts and judiciously placing them onto the 2D NoC topology. In case if inter-communicating hosts are placed far from each other, this can leads to high average and peak structural latencies in number of hops. Such long paths not only increase latency but also adversely affect the interconnect bandwidth, as messages stay in the NoC for longer periods and consume bandwidth of a large number of links.

In large-scale networks, efficiency and performance/area tradeoff is of main concern. Mechanisms such as machine learning approach, simulated annealing, among others, provide optimized topology for a system. However, such complex mechanisms have substantial limitations as they involve certain algorithms to automate optimization of layout network, which may violate previously mapped flow's latency constraint or the latency constraint of current flow. Further, it is also to be considered that each user has their own requirements and/or need for SoCs and/or NoCs depending on a diverse applicability of the same. Therefore, there is a need for systems and methods that significantly improve system efficiency by accurately indicating the best possible positions and configurations for hosts and ports within the hosts, along with indicating system level routes to be taken for traffic flows using the NoC interconnect architecture. Systems and methods are also required for automatically generating an optimized topology for a given SoC floor plan and traffic specification with an efficient layout. Further, systems and methods are also required that allows users to specify their requirements for a particular SoC and/or NoC, provides various options for satisfying their requirements and based on this automatically generating an optimized topology for a given SoC floor plan and traffic specification with an efficient layout.

Therefore, there exists a need for methods, systems, and computer readable mediums for overcoming the above-mentioned issues with existing implementations of generating topology for a given NoC/SoC.

SUMMARY

Methods and example implementations described herein are generally directed to a repository of integration description of hardware intellectual property (IP) for NoC construction and SoC integration.

Aspects of the present disclosure relate to methods, systems, and computer readable mediums for overcoming the above-mentioned issues with existing implementations of generating topology for a given SoC by significantly improving system efficiency by forming a repository of integration description of hardware intellectual property (IP) for NoC construction and SoC integration. Such repository of integration description of hardware intellectual property (IP) allows users to specify their requirements for a particular SoC and/or NoC, provides various options for satisfying their requirements and thereby automatically generating an optimized topology for a given SoC floor plan and traffic specification with an efficient layout.

Further, methods, systems, and computer readable mediums are provided to automatically determine topology choices and selecting an optimal design from among them by implementing a heuristic approach to determine optimal host position in such topology layout, so that the load on various channels may be controlled and to achieve efficiency, low latency, and high performance. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

An aspect of the present disclosure relates to a method for managing a repository of hardware intellectual property (IP) for Network-on-Chip (NoC)/System-on-Chip (SoC) construction. The method includes the steps of storing one or more integration descriptions of the hardware IP in the repository, selecting at least one integration description as a parsed selection from said one or more integration descriptions of the hardware IP for incorporation in the NoC/SoC, and generating the NoC/SoC at least from the parsed selection.

In an aspect, the integration descriptions can include information derived from the hardware IP to construct at least a NoC for integration into at least one SoC.

In an aspect, at least one integration description is selected from said one or more integration descriptions of the hardware IP based at least on input received from one or more users.

In an aspect, the input is in a form of a file selected from any or combination of an extended markup language (XML) file, an IP XACT file, a verilog file, a meta-data file or a file in a prescribed or pre-defined format.

In an aspect, the method is implemented in a computing device or a cloud server.

In an aspect, the method can include displaying dependencies of at least one integration description selected from said one or more integration descriptions of the hardware IP.

In an aspect, the method can include registering one or more new IPs, wherein said new IPs are registered based on one or more requirements imposed by a SoC builder platform.

In an aspect, the method can include defining one or more IP specific rules, while registering the one or more new IPs that determines IP values and/or associated relationships allowed for the one or more IP specific rules.

In an aspect, the method can include modifying the one or more integration descriptions for the NoC constructions and SoC integration.

In an aspect, the method can include exporting, in the repository, one or more modifications made in one or more integration descriptions of the hardware IP as at least a new instance.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

An aspect of the present disclosure relates to a system to manage a repository of hardware intellectual property (IP) for Network-on-Chip (NoC)/System-on-Chip (SoC) construction. The system can include a storing module configured to store one or more integration descriptions of the hardware IP in the repository, a selection module configured to select at least one integration description as a parsed selection from said one or more integration descriptions of the hardware IP for incorporation in the NoC/SoC, and a NoC generation module configured to generate the NoC/SoC at least from the parsed selection.

In an aspect, the integration descriptions include information derived from the hardware IP to construct at least a NoC for integration into at least one SoC.

In an aspect, at least one integration description is selected from said one or more integration descriptions of the hardware IP based at least an input received from one or more users.

In an aspect, the input is in a form of a file selected from any or combination of an XML, file, an verilog file, a meta-data file or a file in a prescribed format.

In an aspect, the system is a computing device or a cloud server.

In an aspect, the system can further include a display module configured to display dependencies of the at least one integration description selected on the other integration descriptions selected from said one or more integration descriptions of the hardware IP.

In an aspect, the system can further include a registering module configured to register one or more new IPs, wherein said new IPs are registered based on one or more requirements imposed by a SoC builder platform. In an aspect, the system can further include a defining module configured to define one or more IP specific rules, while registering the one or more new IPs, that determines IP values and/or associated relationships allowed for the one or more IP specific rules.

In an aspect, the system can further include a modifying module configured to modifying the one or more integration descriptions for the NoC constructions and SoC integration.

In an aspect, the system can further include an exporting module configured to export, in the repository, one or more modifications made in the one or more integration descriptions of the hardware IP as at least a new instance.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

An aspect of the present disclosure relates to a non-transitory computer readable storage medium storing instructions for executing a process. The instructions include the steps of storing one or more integration descriptions of the hardware IP in the repository, selecting at least one integration description as a parsed selection from said one or more integration descriptions of the hardware IP for incorporation in the NoC/SoC, and generating the NoC/SoC at least from the parsed selection.

The foregoing and other objects, features and advantages of the example implementations will be apparent and the following more particular descriptions of example implementations as illustrated in the accompanying drawings wherein like reference numbers generally represent like parts of exemplary implementations of the application.

BRIEF DESCRIPTION OF DRAWINGS

FIG. 2B illustrates three different routes between a source and destination nodes.

DETAILED DESCRIPTION

Figure 1A:
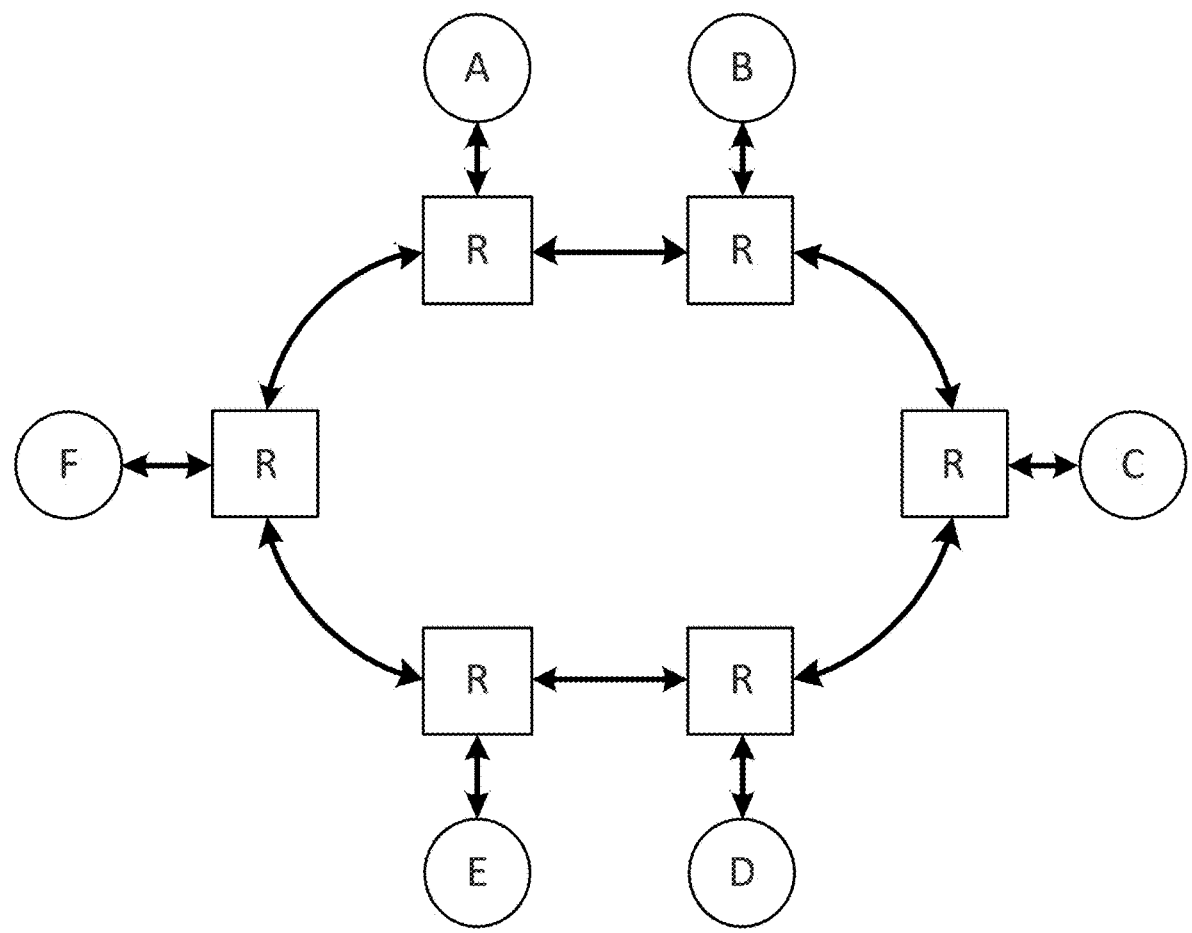
FIGS. 1A, 1B, 1C, and 1D illustrate examples of Bidirectional ring, 2D Mesh, 2D Torus, and 3D Mesh NoC Topologies.
Figure 1B:
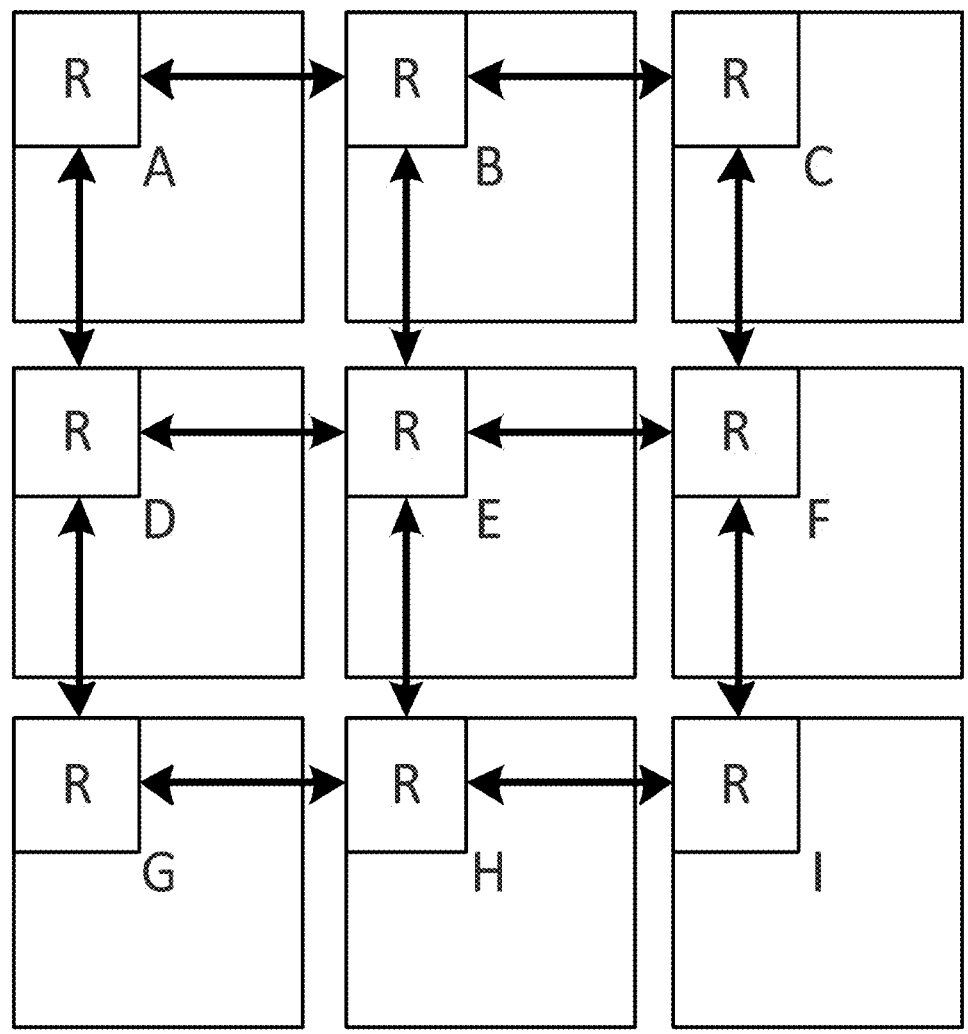
Figure 1C:
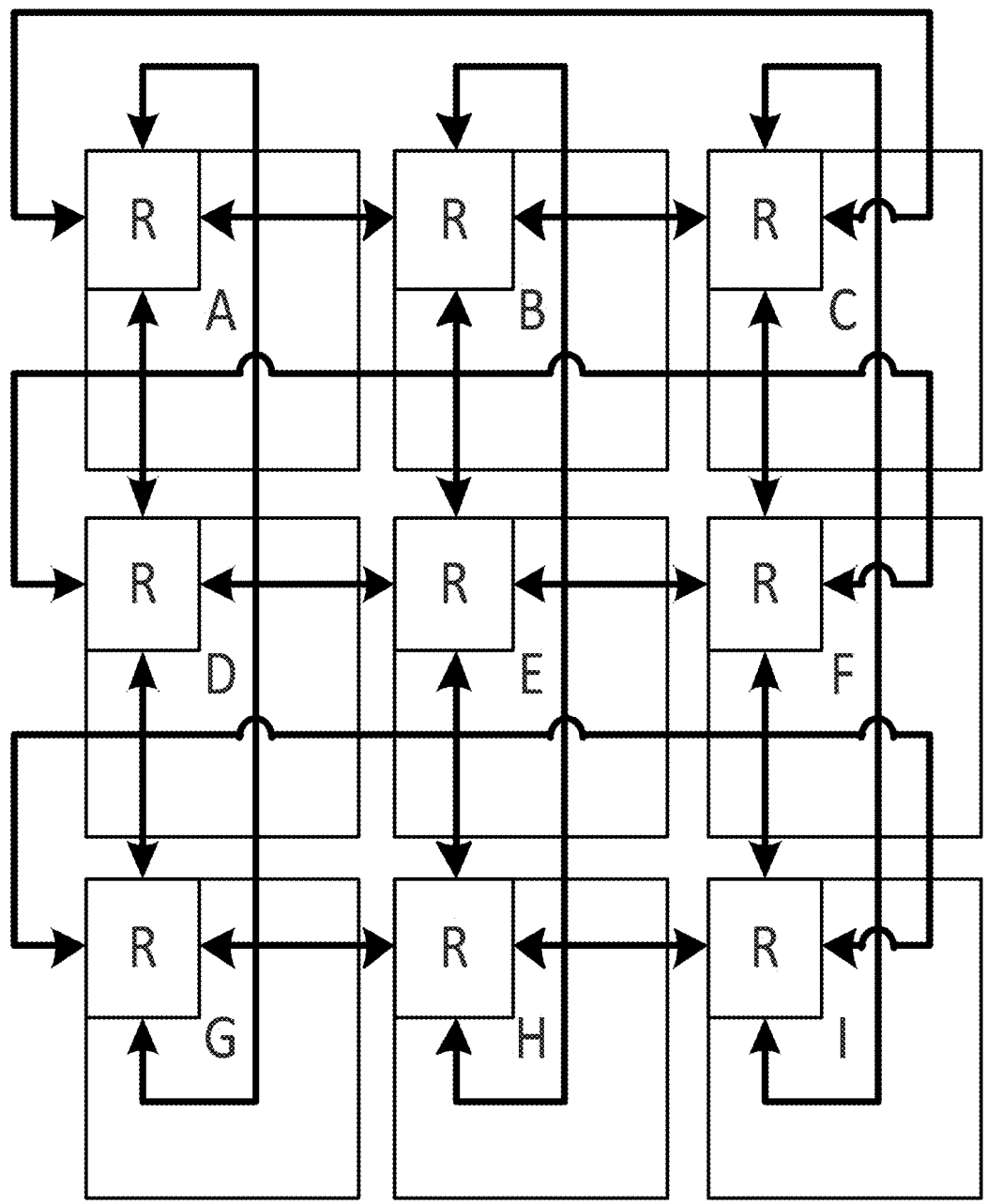
Figure 1D:
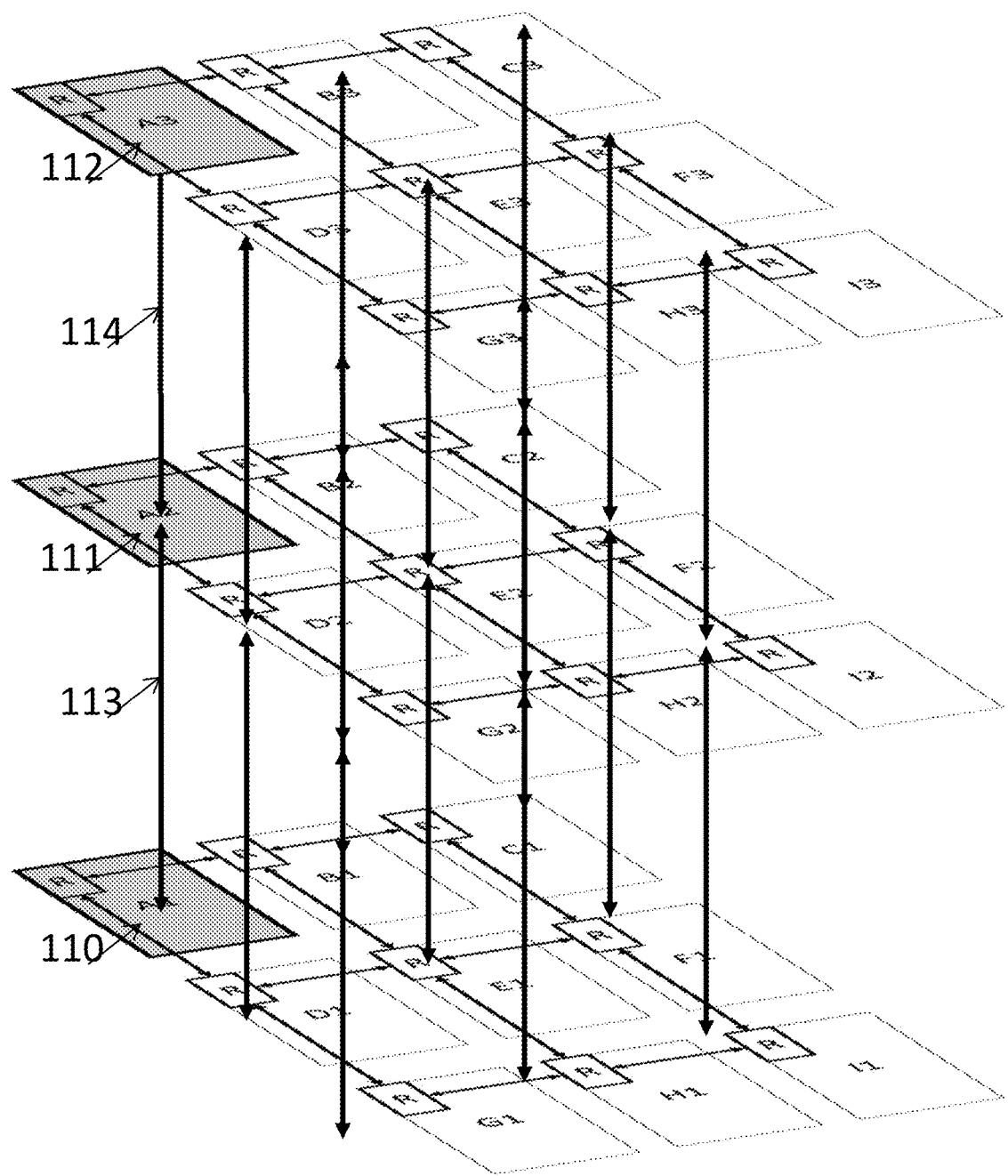
Figure 2A:
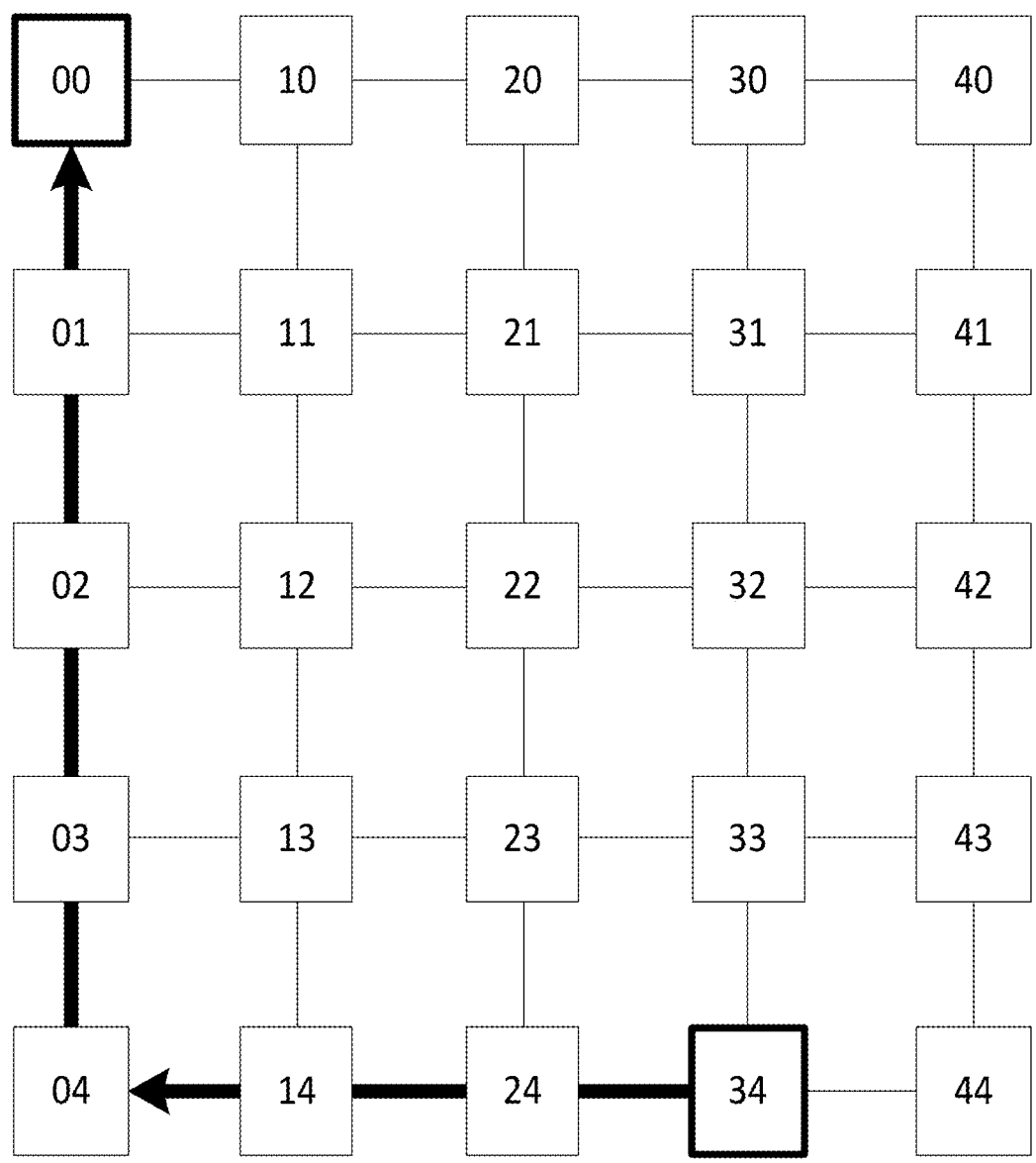
FIG. 2A illustrates an example of XY routing in a related art two dimensional mesh.
Figure 3A:
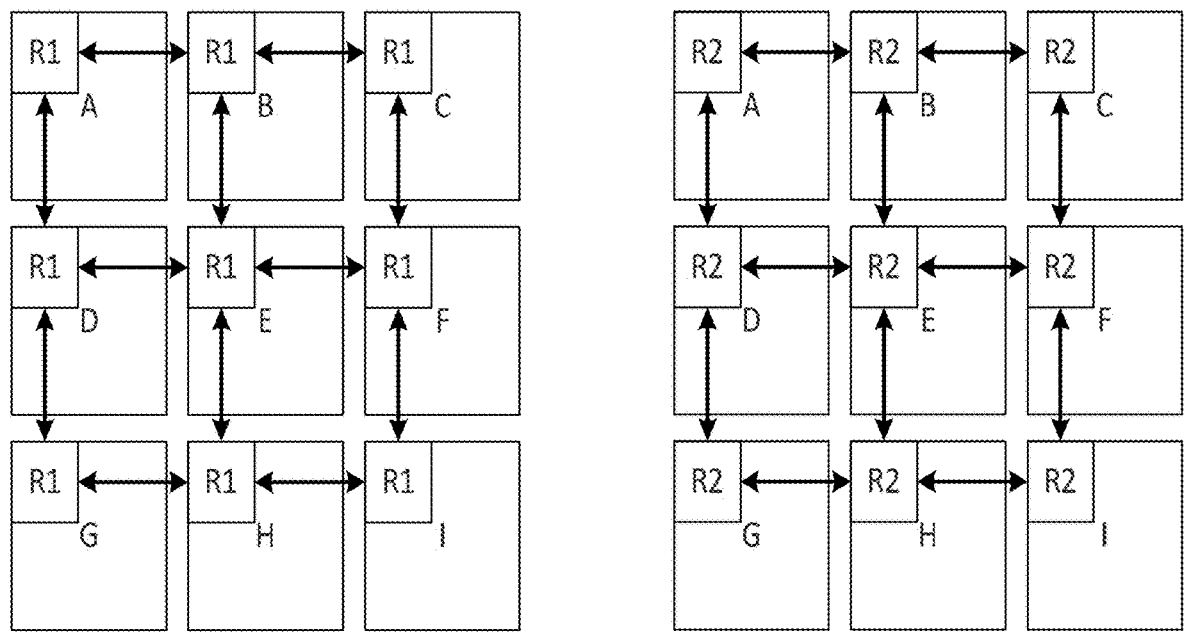
FIG. 3A illustrates an example of a related art two layer NoC interconnect.
Figure 3B:
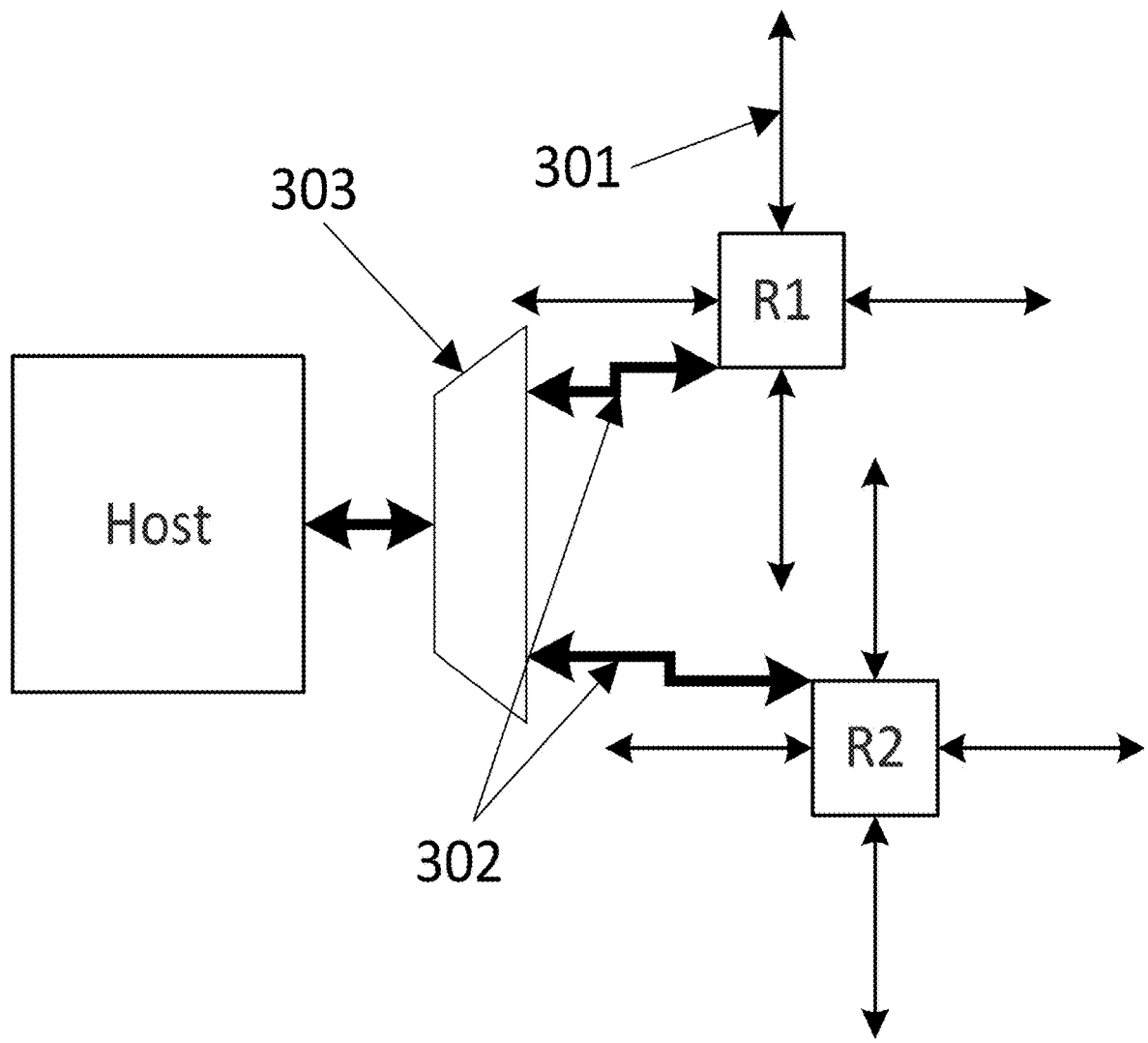
FIG. 3B illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to an interconnect architecture, and more specifically, to repository of integration description of hardware intellectual property (IP) for NoC construction and SoC integration.

Aspects of the present disclosure relate to methods, systems, and computer readable mediums for overcoming the above-mentioned issues with existing implementations of generating topology for a given SoC by significantly improving system efficiency by forming a repository of integration description of hardware intellectual property (IP) for NoC construction and SoC integration. Such repository of integration description of hardware intellectual property (IP) allows users to specify their requirements for a particular SoC and/or NoC, provides various options for satisfying their requirements and thereby automatically generating an optimized topology for a given SoC floor plan and traffic specification with an efficient layout.

Further, methods, systems, and computer readable mediums are provided to automatically determine topology choices and selecting an optimal design from among them by implementing a heuristic approach to determine optimal host position in such topology layout, so that the load on various channels may be controlled and to achieve efficiency, low latency, and high performance. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

An aspect of the present disclosure relates to a method for managing a repository of hardware intellectual property (IP) for Network-on-Chip (NoC)/System-on-Chip (SoC) construction. The method includes the steps of storing one or more integration descriptions of the hardware IP in the repository, selecting at least one integration description as a parsed selection from said one or more integration descriptions of the hardware IP for incorporation in the NoC/SoC, and generating the NoC/SoC at least from the parsed selection.

In an aspect, the integration descriptions can include information derived from the hardware IP to construct at least a NoC for integration into at least one SoC.

In an aspect, the at least one integration description is selected from said one or more integration descriptions of the hardware IP based at least an input received from one or more users.

In an aspect, the input is in a form of a file selected from any or combination of an XML, file, an verilog file, a meta-data file or a file in a prescribed format.

In an aspect, the method is implemented in a computing device or a cloud server.

In an aspect, the method can include displaying dependencies of the at least one integration description selected on the other integration descriptions selected from said one or more integration descriptions of the hardware IP.

In an aspect, the method can include registering one or more new IPs, wherein said new IPs are registered based on one or more requirements imposed by a SoC builder platform.

In an aspect, the method can include defining one or more IP specific rules, while registering the one or more new IPs that determines IP values and/or associated relationships allowed for the one or more IP specific rules.

In an aspect, the method can include modifying the one or more integration descriptions for the NoC constructions and SoC integration.

In an aspect, the method can include exporting, in the repository, one or more modifications made in the one or more integration descriptions of the hardware IP as at least a new instance.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

An aspect of the present disclosure relates to a system to manage a repository of hardware intellectual property (IP) for Network-on-Chip (NoC)/System-on-Chip (SoC) construction. The system can include a storing module configured to store one or more integration descriptions of the hardware IP in the repository, a selection module configured to select at least one integration description as a parsed selection from said one or more integration descriptions of the hardware IP for incorporation in the NoC/SoC, and an NoC generation module configured to generate the NoC/SoC at least from the parsed selection.

In an aspect, the integration descriptions include information derived from the hardware IP to construct at least a NoC for integration into at least one SoC.

In an aspect, at least one integration description is selected from said one or more integration descriptions of the hardware IP based at least on input received from one or more users.

In an aspect, the input is in a form of a file selected from any or combination of an XML, file, an verilog file, a meta-data file or a file in a prescribed or pre-defined format.

In an aspect, the system is a computing device or a cloud server.

In an aspect, the system can further include a display module configured to display dependencies of the at least one integration description selected on the other integration descriptions selected from said one or more integration descriptions of the hardware IP.

In an aspect, the system can further include a registering module configured to register one or more new IPs, wherein said new IPs are registered based on one or more requirements imposed by a SoC builder platform. In an aspect, the system can further include a a defining module configured to define one or more IP specific rules, while registering the one or more new IPs, that determines IP values and/or associated relationships allowed for the one or more IP specific rules.

In an aspect, the system can further include a modifying module configured to modifying the one or more integration descriptions for the NoC constructions and SoC integration.

In an aspect, the system can further include an exporting module configured to export, in the repository, one or more modifications made in the one or more integration descriptions of the hardware IP as at least a new instance.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

An aspect of the present disclosure relates to a non-transitory computer readable storage medium storing instructions for executing a process. The instructions include the steps of storing one or more integration descriptions of the hardware IP in the repository, selecting at least one integration description as a parsed selection from said one or more integration descriptions of the hardware IP for incorporation in the NoC/SoC, and generating the NoC/SoC at least from the parsed selection.

Figure 4A:
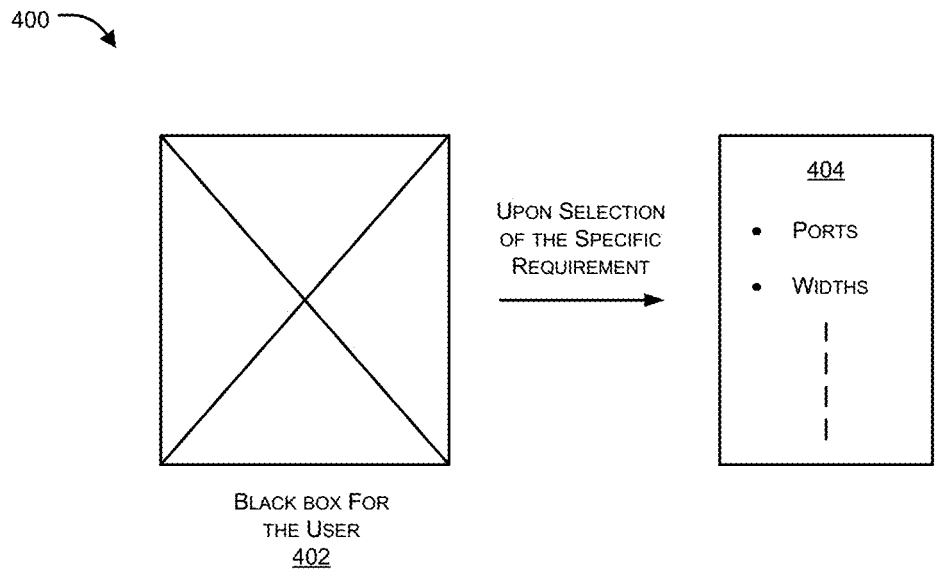
FIG. 4A illustrates a black box approach of the system.

FIG. 4A illustrates a black box approach of the system. As shown in FIG. 4A, a user is presented with a black box approach 400 e.g., the example implementations provides a device, system or object which can be viewed in terms of its inputs and outputs (or transfer characteristics), without any knowledge of its internal workings.

The user can merely provide the required inputs and/or specific selections of the specific requirements 402 and the system provides a best proposed Network-on-Chip (NoC)/System-on-Chip (SoC) construction 404 matching the user requirements. In this example implementation, the user requirements are provided as manual selection or in the form of any file format to generate a desired SoC. For example, the user can specify the number of ports and the capability of those ports to receive a specific protocol.

Figure 4B:
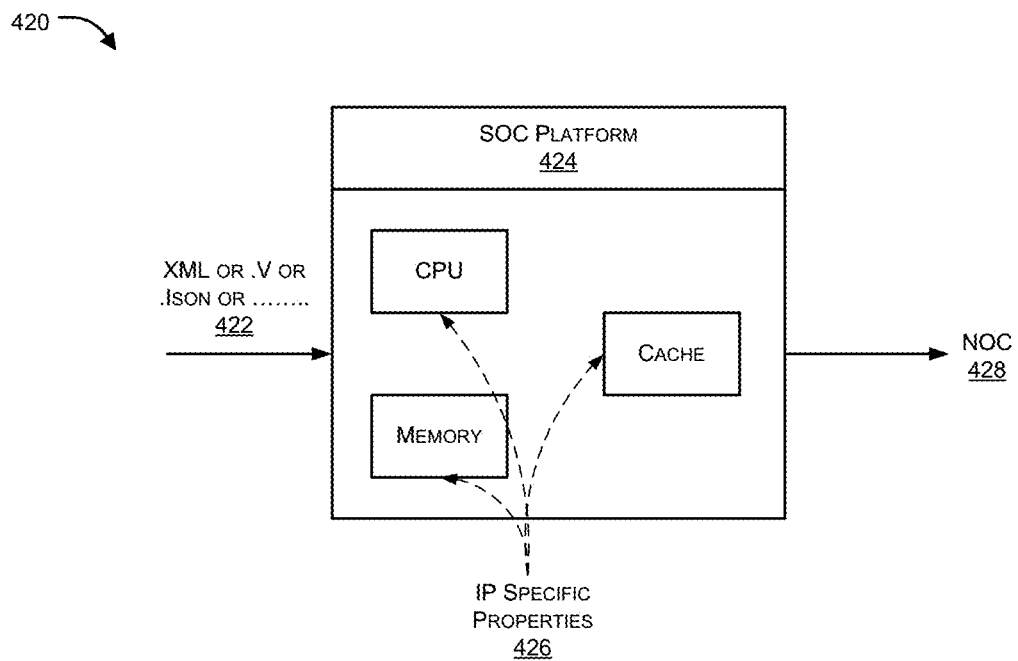
FIG. 4B-4C illustrates a SoC platform for managing a repository of hardware intellectual property (IP) for Network-on-Chip (NoC)/System-on-Chip (SoC) construction.
Figure 4C:
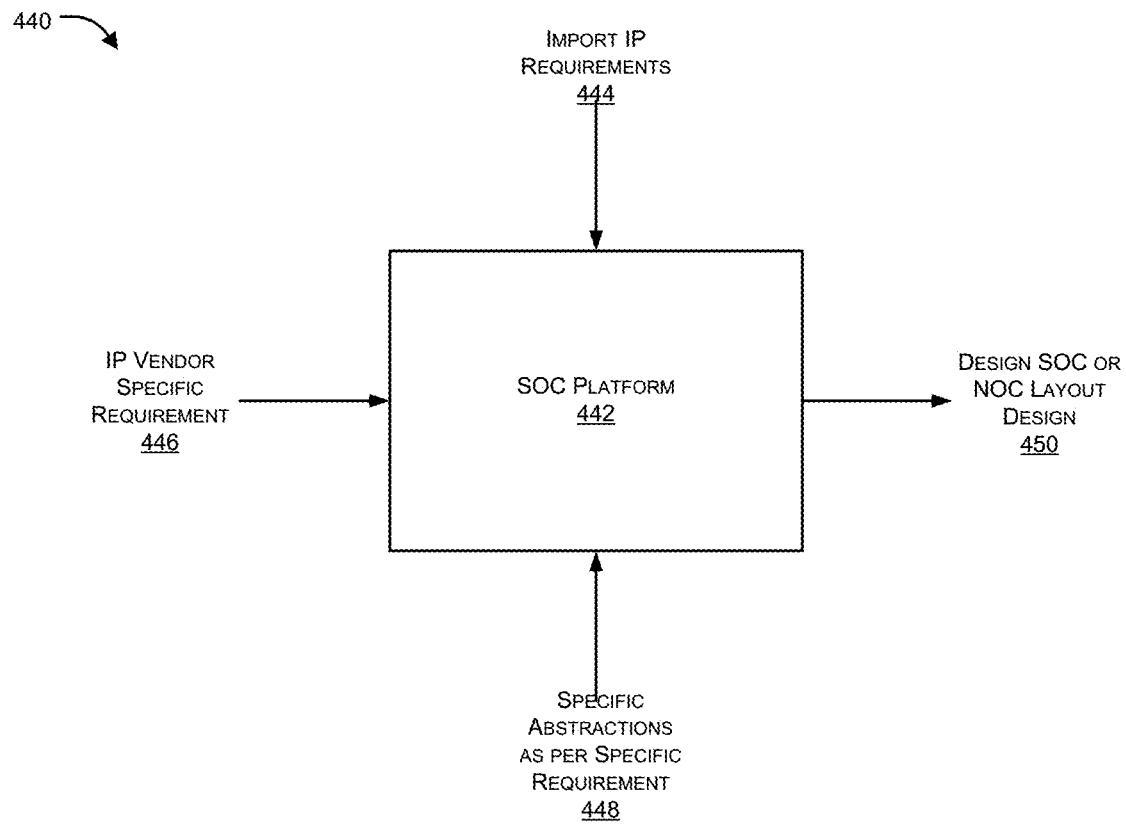

FIG. 4B-4C illustrates a SoC platform for managing a repository of hardware intellectual property (IP) for Network-on-Chip (NoC)/System-on-Chip (SoC) construction.

In an example implementation, FIG. 4B 420 illustrates a proposed SoC platform 424 that receives a plurality of inputs 422 form the uses for Network-on-Chip (NoC)/System-on-Chip (SoC) construction. The input 422 can be in the form of files such as but not limited to an XML file, a verilog file, an JSON file, a NCF file or a vendor meta-data. The input files may include details associated with the requirements of the user for constructing a NoC and/or SoC. For example, the user can specify the number of ports and the capability of those ports to receive a specific protocol.

As shown in FIG. 4B, the present application allows user to not only provide inputs 422 of the requirements but also enables to select IP specific properties 426 associated with or generated for the inputs 422. Upon selection of the IP specific properties 426, the SoC platform 424 constructs a NoC/SoC combining the inputs 422 and the IP specific properties 426.

In an example implementation, the IP specific properties 426 can be selected form a database/repository pre-configured/pre-stored in the SoC platform 424.

Referring now to FIG. 4C 440, a SoC platform 442 can receive inputs such as an IP vendor specific requirement 446, specific abstractions as per specific requirements (such as performance characterization), and import IP requirements 444 from files such as but not limited to an XML, file, a verilog file, an JSON file, a NCF file or a vendor meta-data.

Upon receipt of the inputs, the SoC platform 442 analyzes the inputs and constructs a best possible NoC/SoC by combining the inputs 444, 446, 448.

Figure 4D:
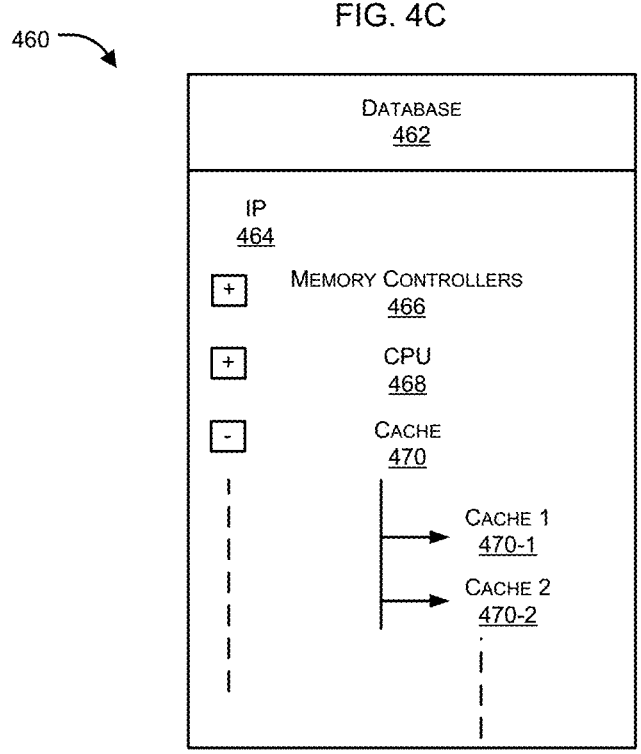
FIG. 4D illustrates an exemplary database/repository of hardware intellectual property (IP) for Network-on-Chip (NoC)/System-on-Chip (SoC) construction.

FIG. 4D 460 illustrates an exemplary database/repository 462 of hardware intellectual property (IP) for Network-on-Chip (NoC)/System-on-Chip (SoC) construction. In an example implementation, List of Database contain list of IP's such as CPU, memory controllers, cache, etc. they can be stored through the parallel files, devices, any other generalized or customized format. The user can have a certain visibility of the stored IP which includes the information needed to build a NoC. The database 462 can be an interface indicating the connectivity that is facing the NoC, so that the user is informed of the ports, parameters including the properties like password, address, physical size, and so on.

The user can build the NoC according to their specification and add it to the associated bracket.

The database 462 contains the information needed to build a SoC according to the desired implementation. For example, the user can select the required parameters and a SoC can be built based on that the selection. As shown in FIG. 4A and FIG. 4B the system provides a black box to the user where the user needs to only select the requirement and the system at the backend already has all the required information in terms of requirements for building SoC. For example, ports, widths, and parameters including the properties like password, address, physical size are already incorporated in the database.

Thus in example implementation, the requirement as shown in FIG. 4A and FIG. 4B, for the system is set based on manual selection or through any file format to generate a desired SoC. For example, the user can specify the number of ports and the capability of those ports to receive a specific protocol in the requirement.

As shown in FIG. 4D, the database 462 contains a plurality of IP 464 pre-stored. For example, as shown in FIG. 4D, the plurality of IP 464 can include memory controllers 466, CPUs 468, and cache 470. The plurality of IP 464 can further include sub-data associated with specific model of the IP. For example, the cache 470 can include a plurality of caches depending on the various types such as but not limited to cache 1 470-1, cache 2 470-2, ... and the like.

Figure 4E:
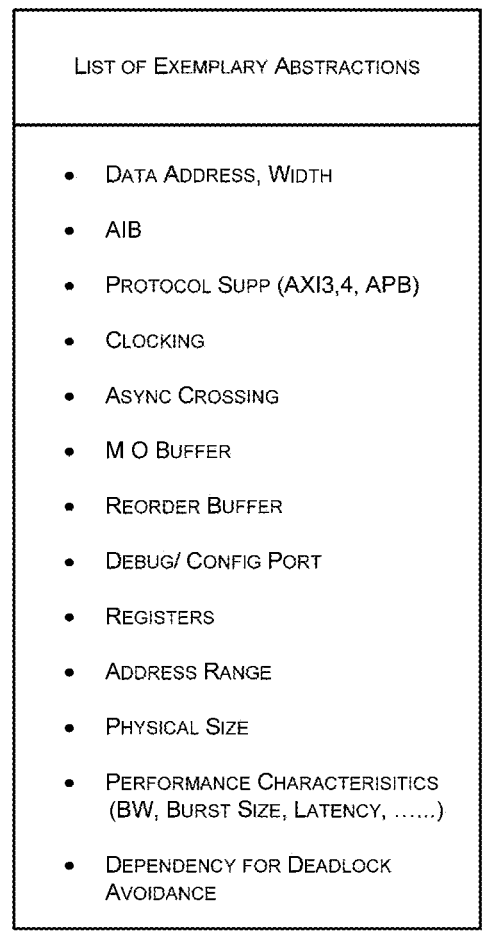
FIG. 4E illustrates a list of exemplary abstractions for hardware intellectual property (IP) for Network-on-Chip (NoC)/System-on-Chip (SoC) construction.

FIG. 4E illustrates 480 a list of exemplary abstractions for hardware intellectual property (IP) for Network-on-Chip (NoC)/System-on-Chip (SoC) construction. In an example implementation, the system facilitates a manual selection or provides requirement in any file format to generate a desired SoC. However, when the user selects their requirement and/or provides/feeds their requirements, there are certain modifiers applied to the same based on some pre-defined rules. For example, once a CPU is selected, it may have an L2 cache or can be modified as well based on the user requirements. Thus, the database also has IP specific properties associated with a specific IP and they are re-configurable or modifiable. For example, there is a coherency cache controller and in that one needs to setup directory sizes etc. these are required to build a NoC.

Accordingly, example implementations of the present disclosure provides a library of information or abstractions associated with the IP that is required for the customers to enable construction of NoC or design a SoC in an easier or faster manner. Basically it provides all the information required for the integration of IP in the SoC as shown in FIG. 4E. The IP abstraction contains all the information of the IP needed for the integration of that IP. Thus the user needs to only select the abstraction based on the requirements and the system efficiently and automatically constructs SoC/NoC for them.

In an exemplary implementation, the library of information or abstractions associated with the IP, can include but not limited to, data address, width, AIB, protocol supp (AX13, 3, APB), clocking, asynchronous crossing, Outstanding requests Buffer, Reorder Buffer, Debug/configuration port, registers, address range, physical size, and performance characteristics (Bandwidth, Burst Size, Latency, etc).

Figure 5A:
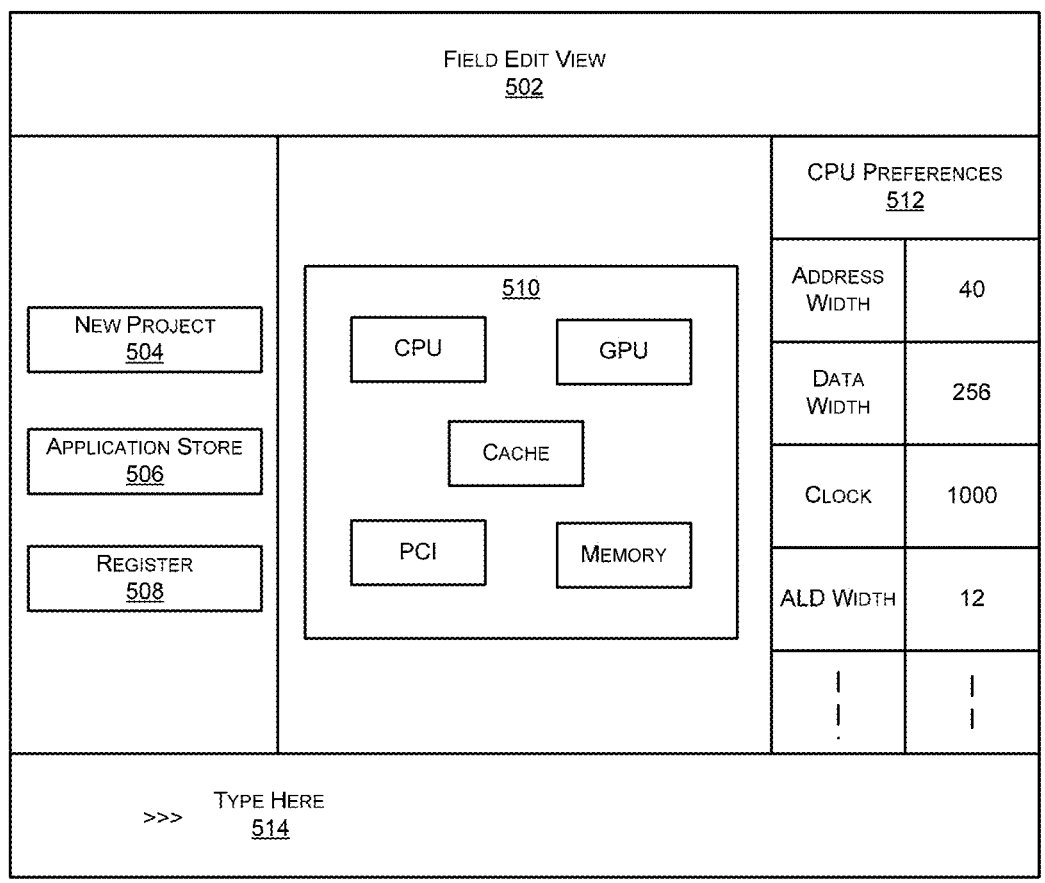
FIG. 5A illustrates an exemplary interface of the SoC platform for managing a repository of hardware intellectual property (IP) for Network-on-Chip (NoC)/System-on-Chip (SoC) construction.

FIG. 5A illustrates an exemplary interface 500 of the SoC platform for managing a repository of hardware intellectual property (IP) for Network-on-Chip (NoC)/System-on-Chip (SoC) construction. As shown in FIG. 5A, the interface 500 can include a plurality of options, such as but not limited to, New Project 504 (for providing inputs to construct a new NoC/SoC), Application Store 506 (for registering a new IP information in the library), and Register 508 (for displaying/selecting a specific IP information from the library). In an exemplary implementation, each of these options can open a new interface showing plurality of different menus and/or options.

Further, as shown in FIG. 5A, the interface 500 can include a field edit view 502, which is operational when the user selects New Project 504 option (for providing inputs to construct a new NoC/SoC). The user upon selection of the New Project 504 option can customize or configures the construction of a new NoC/SoC as per his requirements. For example, in the field edit view 502 the user can view the IP selected 502 based on the inputs provided. The inputs can be provided in a form of a file selected from any or combination of an XML, file, a verilog file, a meta-data file or a file in a prescribed or pre-defined format.

Also, when the user selects their requirement and/or provides/feeds their requirements, there are certain modifiers applied to the same based on some pre-defined rules as shown with CPU preference 512. For example, once a CPU is selected, it may have an L2 cache or can be modified as well based on the user requirements. Thus, the database also has IP specific properties associated with a specific IP and they are re-configurable or modifiable. For example, there is a coherency cache controller and in that one needs to setup directory sizes etc. these are required to build a NoC.

In an example, the user may select the CPU preference 512 from the pre-defined/pre-configured library/database as shown in FIG. 4D-E. The present invention provides library of information or abstractions associated with the IP that is required for the customers to enable construction of NoC or design a SoC in easier or faster manner. Basically it provides all the information required for the integration of IP in the SoC.

Figure 5B:
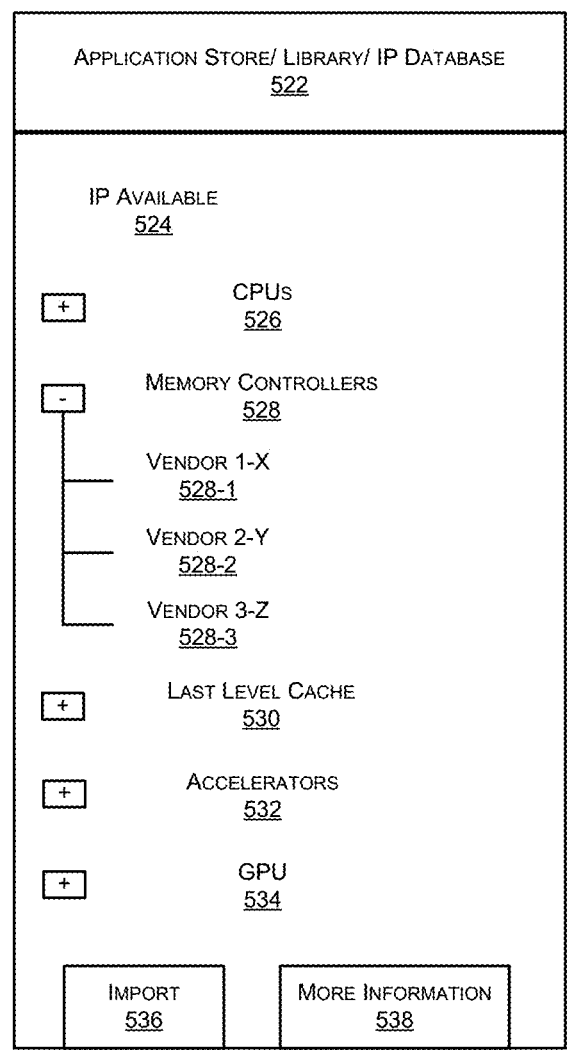
FIGS. 5B-5C illustrates a plurality of options provided by the exemplary interface of the SoC platform.

In an example implementation, as shown in FIG. 5B 520, upon selection of Application Store 506 (for registering a new IP information in the library) option can view the pre-defined/pre-configured library/database as shown in FIG. 4D-E. The present invention provides library of information or abstractions 522 associated with the IP that is required for the customers to enable construction of NoC or design a SoC in easier or faster manner. Basically it provides all the information required for the integration of IP in the SoC.

In an example implementation, it may be appreciated that even though the user provides a required IP details however it may happen that the user may casually ignore the current/latest IP which may be best fit for the constructions of the NoC/SoC. Thus such mishapenning can be avoided using the library of information or abstractions 522 associated with the IP. Accordingly, as shown in FIG. 5B, the details of available IP 524, can be made visible in the library of information or abstractions 522, for example, CPUs 526, memory controllers 528, last level cache 530, accelerators 532, and GPU 534. In an example implementation, these lists of available IP 524 can include various other expandable/extractable sub-IP details which may be associated with versions or sub-types or product received from various vendors. For example, the memory controllers 528 can be received from various vendors and are accordingly included in the details of available IP 524, such as but not limited to, vendor 1-X 528-1, vendor 1-Y 528-2, vendor 3-Z 528-3, etc. The library of information or abstractions 522 also provide an option to import 536 details associated with any of the IP and/or sub-IP and an option for showing more information 538 to display more information about the IP and/or sub-IP.

Figure 5C:
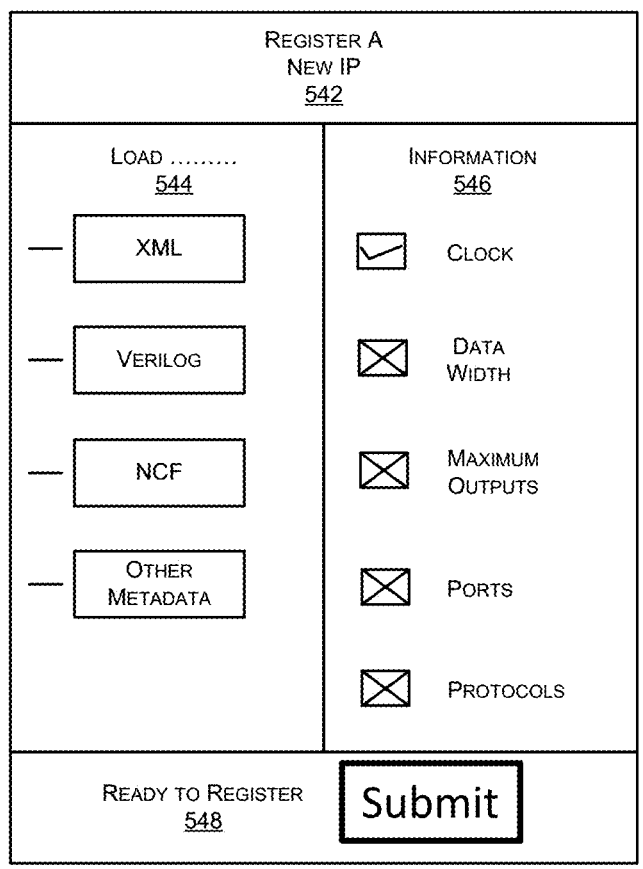

Referring now to FIG. 5C, when user selects an option to Register 508 (for displaying/selecting a specific IP information from the library), an interface 540 showing an exemplary interface for registering a new IP 542. The user is provided to update/input details associated with the new IP using this interface 540.

In an example implementation, as shown in FIG. 5C, the interface 540 enables loading of IP abstraction details 544. In an example, the loading can be using a file selected from any or combination of an XML, file, a verilog file, a meta-data file or a file in a prescribed or pre-defined format. Based on the requirements and the user interest, the user can select the information 526 to be updated in the library either by way of selecting or by clicking check boxes. Upon loading, the user can click/select 548 on the submit button (as shown with "click here" on the interface 540) to update in the register.

Figure 6:
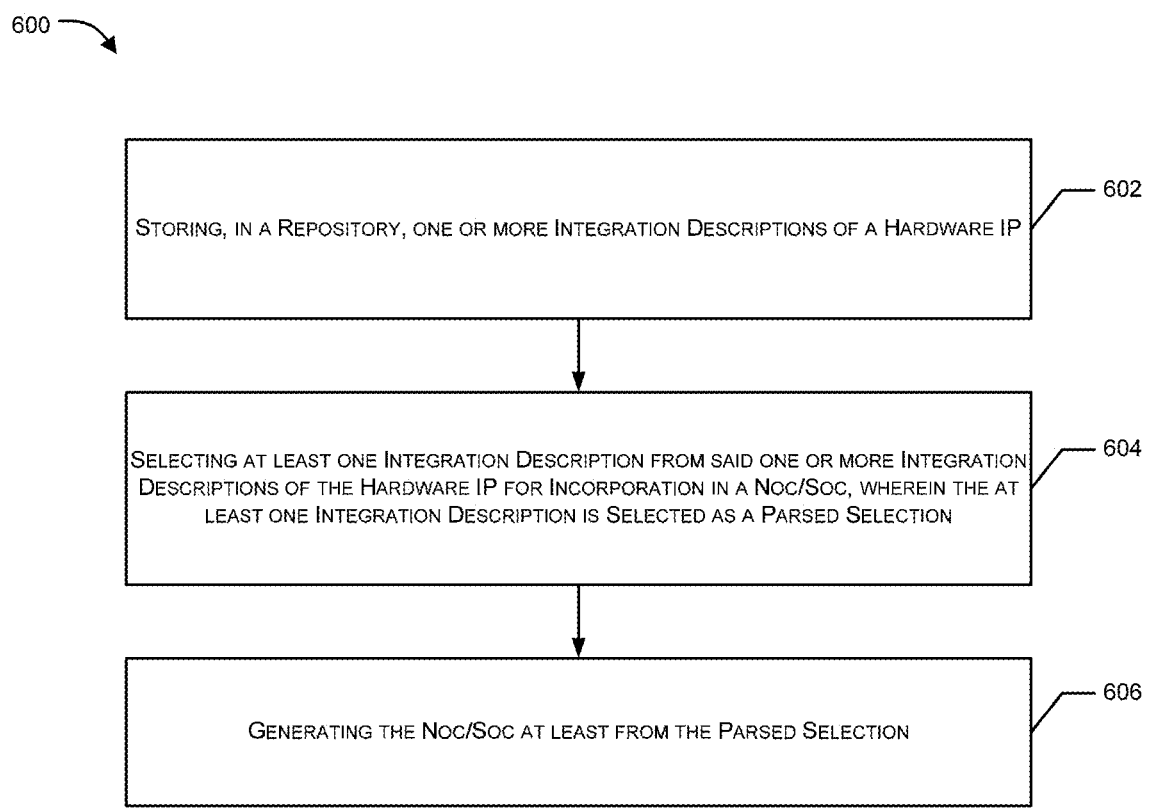
FIG. 6 illustrates an exemplary flow diagram for generating a Network-on-Chip (NoC) topology.

FIG. 6 illustrates an exemplary flow diagram for generating a Network-on-Chip (NoC) topology. In an example implementation, a method 600 for managing a repository of hardware intellectual property (IP) for Network-on-Chip (NoC)/System-on-Chip (SoC) construction. At step 602 one or more integration descriptions of the hardware IP are stored in the repository. At step 604, at least one integration description are selected as a parsed selection from said one or more integration descriptions of the hardware IP for incorporation in the NoC/SoC. At step 606, the NoC/SoC are generated based at least from the parsed selection.

In an aspect, the integration descriptions can include information derived from the hardware IP to construct at least a NoC for integration into at least one SoC.

In an aspect, at least one integration description is selected from said one or more integration descriptions of the hardware IP based at least an input received from one or more users.

In an aspect, the input is in a form of a file selected from any or combination of an XML, file, an verilog file, a meta-data file or a file in a prescribed or pre-defined format.

In an aspect, the method is implemented in a computing device or a cloud server.

In an aspect, the method can include displaying dependencies of at least one integration description selected on the other integration descriptions selected from said one or more integration descriptions of the hardware IP.

In an aspect, the method can include registering one or more new IPs, wherein said new IPs are registered based on one or more requirements imposed by a SoC builder platform.

In an aspect, the method can include defining one or more IP specific rules, while registering the one or more new IPs that determines IP values and/or associated relationships allowed for the one or more IP specific rules.

In an aspect, the method can include modifying the one or more integration descriptions for the NoC constructions and SoC integration.

In an aspect, the method can include exporting, in the repository, one or more modifications made in the one or more integration descriptions of the hardware IP as at least a new instance.

In an aspect, the integration description comprises any or combination of performance goals/characteristics, pin information, port information, addressing/address information, clocking/clock information, protocol characteristics, buffer requirements, data width information, physical size information, tracing and debugging properties, domain crossing requirements, power information, and voltage information.

Figure 7:
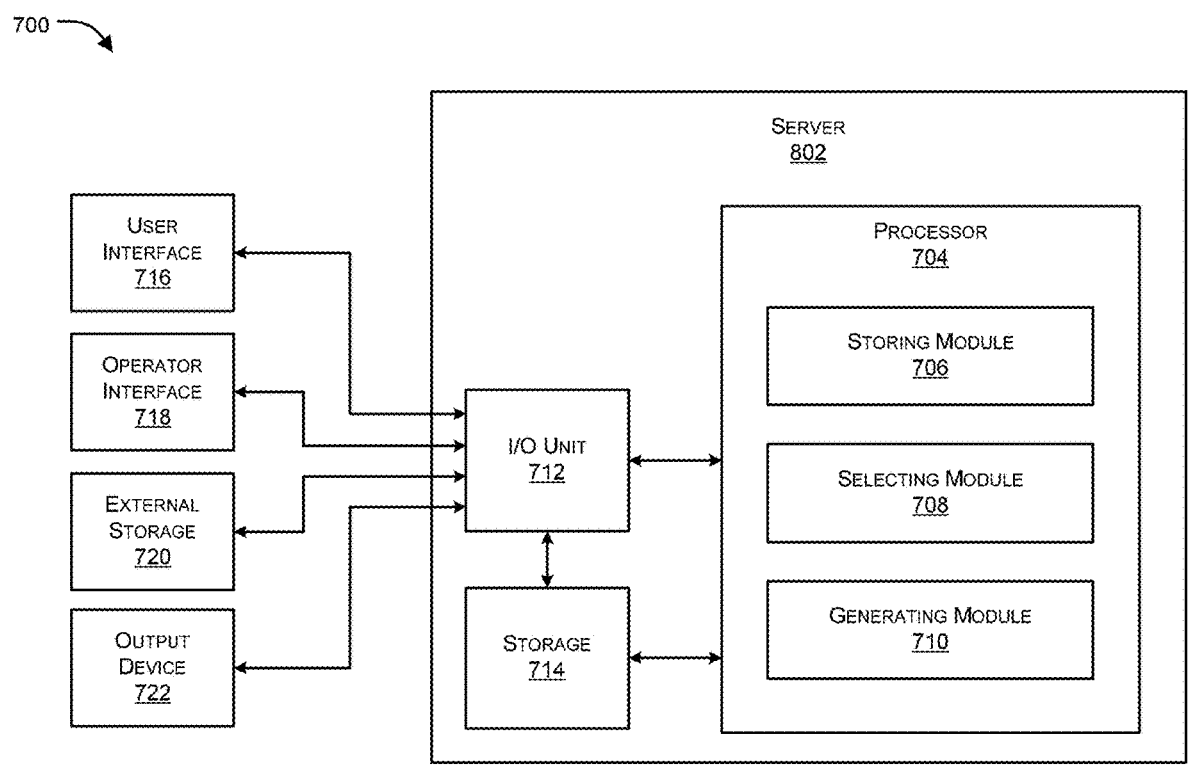
FIG. 7 illustrates an example computer system on which example implementations may be implemented.

FIG. 7 illustrates an example computer system on which example implementations may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 700 includes a server 802 that may involve an I/O unit 712, storage 714, and a processor 704 operable to execute one or more units as known to one skilled in the art. The term "computer-readable medium" as used herein refers to any medium that participates in providing instructions to processor 704 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 716 and operator interfaces 718 which may utilize input devices such as a keyboard, mouse, touch device, or verbal command The server 802 may also be connected to an external storage 720, which can contain removable storage such as a portable hard drive, optical media (CD or DVD), disk media or any other medium from which a computer can read executable code. The server may also be connected an output device 722, such as a display to output data and other information to a user, as well as request additional information from a user. The connections from the server 802 to the user interface 716, the operator interface 718, the external storage 720, and the output device 722 may via wireless protocols, such as the 802.11 standards, Bluetooth® or cellular protocols, or via physical transmission media, such as cables or fiber optics. The output device 722 may therefore further act as an input device for interacting with a user.

The processor 704 may execute one or more modules including a storing module 706 to store one or more integration descriptions of the hardware IP in the repository, a selection module 708 to select at least one integration description as a parsed selection from said one or more integration descriptions of the hardware IP for incorporation in the NoC/SoC, and an NoC generation module 710 to generate the NoC/SoC at least from the parsed selection.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for managing a repository of hardware intellectual property (IP) for Network-on-Chip (NoC) or System-on-Chip (SoC) construction, said method comprising:
    storing, in the repository, one or more integration descriptions of the hardware IP, the one or more integration descriptions comprising information derived from the hardware IP to construct at least an NoC for integration into at least one SoC;
    selecting at least one integration description from said one or more integration descriptions of the hardware IP for incorporation in the NoC or the at least one SoC, wherein the at least one integration description is selected as a parsed selection; and
    generating the NoC or the at least one SoC based at least in part on the parsed selection,
    wherein the integration description comprises protocol characteristics, wherein a number of ports of the NOC and capability of each of the ports to receive a specific protocol is to be determined based on user input.

2. The method of claim 1, wherein said at least one integration description is selected from said one or more integration descriptions of the hardware IP based at least on input received from one or more users.

3. The method of claim 1, wherein said input is in a form of a file selected from any or combination of an XML file, an IP XACT file, a verilog file, a meta-data file or a file in a prescribed or pre-defined format.

4. The method of claim 1, wherein said method is implemented in a computing device or a cloud server.

5. The method of claim 1, further comprising: displaying dependencies of the at least one integration description selected in relation to other ones of the at least one integration descriptions selected from said one or more integration descriptions of the hardware IP.

6. The method of claim 1, further comprising: registering one or more new IPs, wherein said new IPs are registered based on one or more requirements imposed by a SoC builder platform.

7. The method of claim 6, further comprising: defining one or more IP specific rules, while registering the one or more new IPs, that determines IP values and/or associated relationships allowed for the one or more IP specific rules.

8. The method of claim 1, further comprising: modifying the one or more integration descriptions for the NoC constructions and SoC integration.

9. The method of claim 8, further comprising: exporting, in the repository, one or more modifications made in the one or more integration descriptions of the hardware IP as at least a new instance.

10. The method of claim 1, wherein the integration description comprises any combination of performance goals, pin information, port information, address information, clock information, the protocol characteristics, buffer requirements, data width information, physical size information, tracing and debugging properties, domain crossing requirements, power information, and voltage information.

11. A non-transitory computer readable medium, storing instructions for managing a repository of hardware intellectual property (IP) for Network-on-Chip (NoC) or System-on-Chip (SoC) construction, said instructions comprising:
    storing, in the repository, one or more integration descriptions of the hardware IP, the one or more integration descriptions comprising information derived from the hardware IP to construct at least an NoC for integration into at least one SoC;
    selecting at least one integration description from said one or more integration descriptions of the hardware IP for incorporation in the NoC or the at least one SoC, wherein the at least one integration description is selected as a parsed selection; and
    generating the NoC or the at least one SoC based at least in part on the parsed selection,
    wherein the integration description comprises protocol characteristics, wherein a number of ports of the NOC and capability of each of the ports to receive a specific protocol is to be determined based on user input.

12. The non-transitory computer readable medium of claim 11, wherein said at least one integration description is selected from said one or more integration descriptions of the hardware IP based at least on input received from one or more users.

13. The non-transitory computer readable medium of claim 11, wherein said input is in a form of a file selected from any or combination of an XML file, an IP XACT file, a verilog file, a meta-data file or a file in a prescribed or pre-defined format.

14. The non-transitory computer readable medium of claim 11, wherein said instructions are stored in a computing device or a cloud server and configured to be executed by one or more hardware processors.

15. The non-transitory computer readable medium of claim 11, the instructions further comprising: displaying dependencies of the at least one integration description selected in relation to other ones of the at least one integration descriptions selected from said one or more integration descriptions of the hardware IP.

16. The non-transitory computer readable medium of claim 11, the instructions further comprising: registering one or more new IPs, wherein said new IPs are registered based on one or more requirements imposed by a SoC builder platform.

17. The non-transitory computer readable medium of claim 16, further comprising: defining one or more IP specific rules, while registering the one or more new IPs, that determines IP values and/or associated relationships allowed for the one or more IP specific rules.

18. The non-transitory computer readable medium of claim 11, the instructions further comprising: modifying the one or more integration descriptions for the NoC constructions and SoC integration.

19. The method of claim 8, further comprising: exporting, in the repository, one or more modifications made in the one or more integration descriptions of the hardware IP as at least a new instance.

20. The method of claim 1, wherein the integration description comprises any combination of performance goals, pin information, port information, address information, clock information, the protocol characteristics, buffer requirements, data width information, physical size information, tracing and debugging properties, domain crossing requirements, power information, and voltage information.

21. The method of claim 1, further comprising selecting the protocol characteristics based at least on one or more port capabilities.

22. The method of claim 1, wherein the integration description comprises any combination of the protocol characteristics and data bandwidth information.

\* \* \* \* \*